United States Patent [19]

Vance

[11] 4,193,034

[45] Mar. 11, 1980

[54] RADIO RECEIVER FOR FSK SIGNALS

[75] Inventor: Ian A. W. Vance, Newport, England

[73] Assignee: International Standard Electric Corporation, New York, N.Y.

[21] Appl. No.: 922,245

[22] Filed: Jul. 6, 1978

[51] Int. Cl.² .............................................. H04L 27/14
[52] U.S. Cl. ...................................... 375/88; 178/66.1; 329/104
[58] Field of Search ............... 325/30, 320; 178/66 R, 178/88; 329/104, 105, 122

[56] References Cited

U.S. PATENT DOCUMENTS

| 2,977,417 | 3/1961 | Doelz et al. | 178/88 |
| 3,439,283 | 4/1969 | Danielson | 325/320 |
| 3,906,376 | 9/1975 | Bass | 329/104 |

Primary Examiner—Marc E. Bookbinder
Attorney, Agent, or Firm—John T. O'Halloran; Alfred C. Hill

[57] ABSTRACT

A simple radio receiver for FSK signals as used in a paging system. RF signals from the aerial are mixed in two high gain mixers with local oscillator signals which are in quadrature and which are at the nominal center frequency of the input signal. The output from the mixers are low-pass filtered so as to extract the difference frequency. The low-pass filter bandwidth is equal to the sideband width of the RF signal. Baseband signals from the filters are now amplified in high gain limiting amplifier stages which deliver fully symmetrically limited outputs at logic level to a D-type flip-flop.

3 Claims, 2 Drawing Figures

RADIO RECEIVER FOR FSK SIGNALS

BACKGROUND OF THE INVENTION

This invention relates to a radio receiver for frequency shift keyed signals on an RF carrier.

In a conventional superhet receiver the image response of the receiver is a first-order response and must be filtered out. A continual trade-off must be made between selectivity and loss due to the finite "Q" of the filter elements. In small size equipments this problem becomes extreme as the obtainable "Q" is lower. Furthermore, even in single channel applications the several sections of filtering need to be individually adjusted, thus increasing assembly costs.

In the particular case of receivers for wide-area pocket paging systems all these problems are present simultaneously. Small size leads to low "Q", but low losses are required as sensitivity must be high to overcome the poor antenna performance arising from the requirement for small volume. Both size and cost favor an integrated circuit approach but this is difficult to realize with a superhet. Also very low power consumption is of great importance in this application. In general there is a direct trade-off between circuit bandwidth and power consumption and so it is most economical of current to obtain as much gain, and to perform the signal processing, at as low a frequency as possible.

SUMMARY OF THE INVENTION

According to the present invention there is provided a radio receiver for frequency shift keyed (FSK) signals on an RF carrier comprising first and second signal paths to which the received radio signals are applied, each signal path including a mixer circuit followed by a low-pass filter and a limiting amplifier stage, a local oscillator running at the carrier frequency, the local oscillator output being applied to one mixer circuit direct, means for applying the oscillator output to the other mixer circuit with a 90° phase shift, and a D-type clocked flip-flop to the D input of which is applied the output of one of the limiting amplifier stages while the output of the other limiting amplifier stage is applied to the clock input of the flip-flop.

A D-type flip-flop is defined as a bistable circuit which will propagate whatever information is at its conditioning D(data) input prior to the occurrence of a clock pulse to the '1' (or Q) output on the leading edge of a clock pulse.

BRIEF DESCRIPTION OF THE DRAWING

An embodiment of the invention will now be described with reference to the accompanying drawings, in which.

DESCRIPTION OF THE PREFERRED EMBODIMENT

Figure 1:
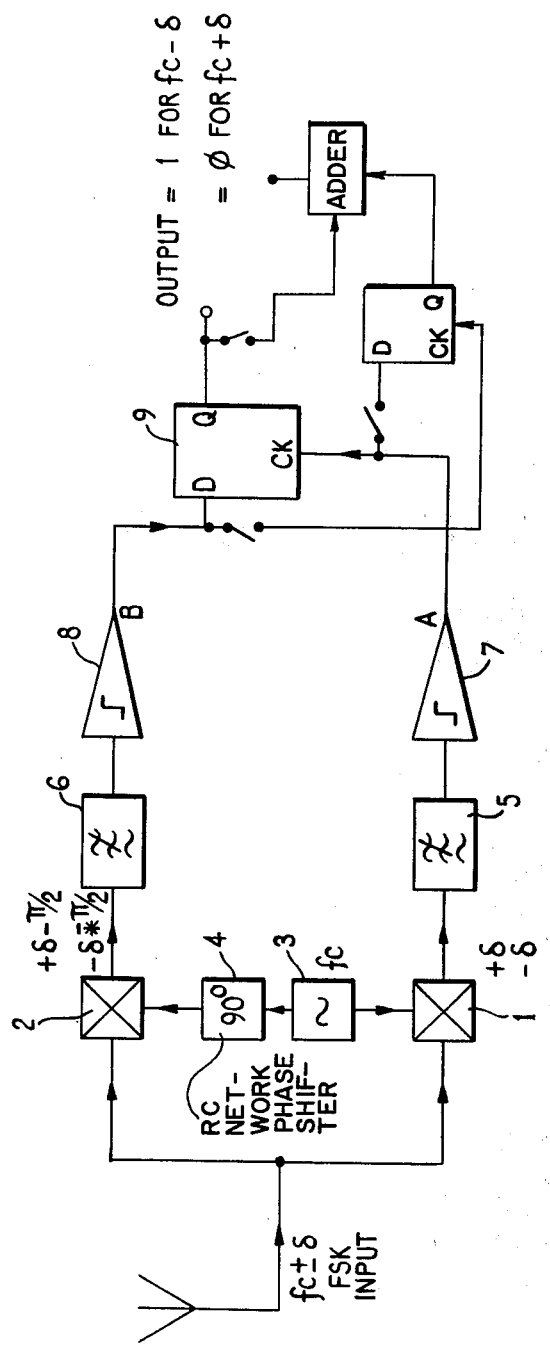
FIG. 1 is a block diagram of a radio receiver according to the invention.

In the receiver of FIG. 1 the received radio signals $f_c \pm \delta$, where $f_c$ is a carrier wave frequency and $\delta$ is the FSK modulation deviation, are fed to two high gain mixer circuits 1 and 2. A local oscillator 3 running at the frequency $f_c$ is fed directly to mixer circuit 1 and via a phase shift network 4, which introduces a 90° phase shift, to mixer 2. The outputs of mixer circuits 1 and 2 are fed to low-pass filters 5 and 6, respectively. The filtered signals are then fed to high gain limiting amplifier stages 7 and 8, respectively. The output of amplifier stage 7 is fed to the clock input of a D-type flip-flop 9 and the output of amplifier stage 8 is fed to the D input of the flip-flop 9.

The difference outputs of the mixer circuits are respectively $+\delta$ and $+\delta - \pi/2$ when the input is $f_c + \delta$, and $-\delta$ and $-\delta - \pi/2$ when the input is $f_c - \delta$. The effect of the low-pass filters is to extract the difference frequency $\delta$. The low-pass filter bandwidth is equal to the sideband width of the RF signal. The difference or baseband signals which are then amplified in stages 7 and 8 provide fully symmetrically limited outputs at logic level to the flip-flop.

Figure 2:
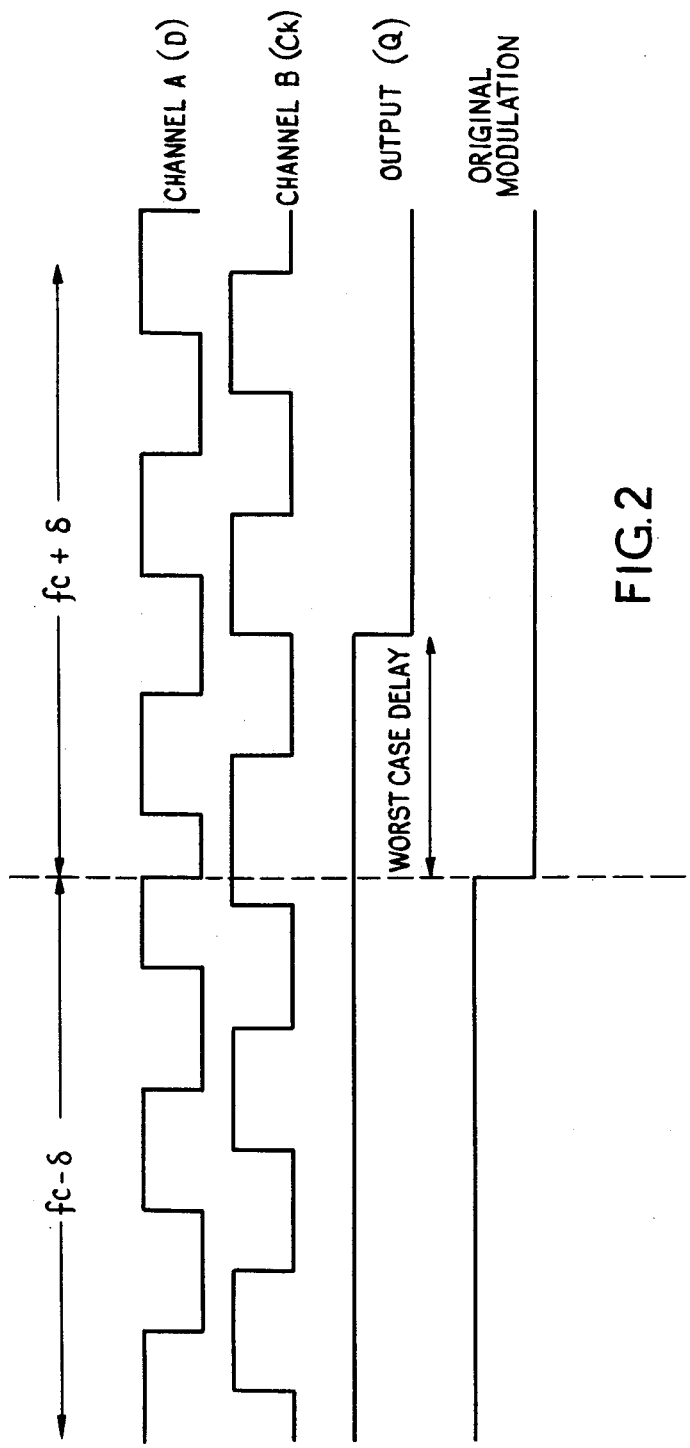
FIG. 2 illustrates some waveforms for the receiver of FIG. 1.

Thus when the input signal is offset from its nominal frequency by $+\delta$ kHz then there will be delivered from the limiters two square waves in quadrature, as shown in the waveform diagram, FIG. 2. When the frequency shifts to the other side of the local oscillator ($-\delta$ kHz) then due to the phase inversion this implies in the mixer, the quadrature phase shift is reversed. This is indicated in the diagram of FIG. 2. The flip-flop is positive edge triggered on the clock input and, thus, detects the lead/lag situation and gives a one or zero at the "Q" output, whichever is present at the D input during the clock transition. The whole system thus produces a logical output depending as to whether the input signal is high or low of the local oscillator.

Clearly there is a constraint on the rate at which the switching from one side to the other can occur. That is, there must be at least one positive edge on the clock line in each information bit period. The maximum bit rate is, therefore, equal to the deviation ($\delta$). This constraint also holds true in the limiting amplifier. Since this component preserves zero crossings while limiting amplitude information, it is necessary for some zero crossings to occur when the signal is on each side of the local oscillator. When the bit rate exceeds the deviation frequency there will not be more than one transition on each side which by Nyquist's criterion conveys insufficient information. Since the phase of the baseband signals on each side of the carrier is arbitrary there will be a variable delay in the changeover of the "Q" output. FIG. 2 illustrates the worst case where a whole cycle of the deviation frequency must occur before the next positive transition changes the output state. (This is clearly the same limitation as that above, as the bit rate increases). The output pulses now have a variation on their width of ± one clock period, but this need not result in an increased error rate if they are correctly processed. It the receiver is mis-tuned, then $\delta$ is effectively reduced by the tuning error, and, hence, the maximum bit rate will be reduced in the same way. The local oscillator 90° phase shift can be seen to be non-critical by inspection of the waveforms of FIG. 2. Thus, phase shifter 4 can be a simple RC network.

In a modification of the arrangement of FIG. 1 a second D-type flip-flop is included, with the channel B signal applied to the clock input and the channel A signal applied to the D input. The '1' or Q output of one flip-flop and the '0' or $\overline{Q}$ output of the other flip-flop are then added algebraically. The ensures that the FSK modulation will now be detected within half a cycle of the deviation frequency, and improves error rate performance at low signal to noise ratios.

I claim:

1. A radio receiver for frequency shift keyed (FSK) signals on an RF carrier comprising first and second signal paths to which the received radio signals are applied, each signal path including a mixer circuit followed by a low pass filter and a limiting amplifier stage, a local oscillator running at the carrier frequency, the local oscillator output being applied to one mixer circuit direct, means for applying the oscillator output to the other mixer circuit with 90° phase shift, and a D-type clocked flip-flop to the D input of which is applied the output of one of the limiting amplifier stages while the output of the other limiting amplifier stage is applied to the clock input of the flip-flop.

2. A receiver according to claim 1 wherein the means for applying the local oscillator output to the other mixer circuit with a 90° phase shift comprises an RC network.

3. A receiver according to claim 1 or 2 including a second D-type clocked flip-flop to the clock input of which is applied the same signal as is applied to the D input of the first flip-flop while to the D input of the second flip-flop is applied the same signal as is applied to the clock input of the first flip-flop, and means for algebraically adding the '1' or Q output of one flip-flop with the '0' or $\overline{Q}$ output of the other flip-flop.

* * * * *